United States Patent
Armbruster et al.

[15] 3,640,847
[45] Feb. 8, 1972

[54] PROCEDURE FOR PRODUCTION OF ALPHA-CYCLODEXTRIN

[72] Inventors: Frederick Carl Armbruster, La Grange; William Arthur Jacaway, Jr., Downers Grove, both of Ill.

[73] Assignee: CPC International Inc.

[22] Filed: Feb. 19, 1969

[21] Appl. No.: 800,766

[52] U.S. Cl. .................................. 195/31 R, 260/209 R
[51] Int. Cl. ............................................. C12d 13/04
[58] Field of Search ............... 195/31, 2, 7, 32, 42, 65, 66, 195/103.5; 99/141, 142; 260/209 D

[56] References Cited

UNITED STATES PATENTS 3,425,910  2/1969  Armbruster et al. ................. 195/31
3,541,077  11/1970  Armbruster ...................... 260/209 D

OTHER PUBLICATIONS

Anderson et al.; Die Stärke, pp. 355–359; 1963
French et al.; Die Stärke, pp. 280–284; 1963
Utsumi et al.; Chem. Abst. No. 13729f; Vol 58; 1963

*Primary Examiner*—Alvin E. Tanenholtz
*Assistant Examiner*—Gary M. Nath
*Attorney*—Frank E. Robbins, James L. Bailey, Janet E. Price, Robert D. Weist, Martha A. Michaels and Dorothy R. Thumler

[57] ABSTRACT

A process for producing alpha-cyclodextrin which comprises subjecting a gelatinized solution of starch to the action of a cyclodextrin transglycosylase enzyme in the presence of an alpha-cyclodextrin complexant and recovering an alpha-cyclodextrin product. A specific class of suitable alpha-cyclodextrin complexants usable in practicing the invention is that class of compounds which contain a saturated or unsaturated aliphatic radical with a longest straight chain carbon skeleton at least eight carbon atoms in length bonded at one end of said longest straight chain to an electronegative atom at least as electronegative as sulfur.

11 Claims, No Drawings

PROCEDURE FOR PRODUCTION OF ALPHA-CYCLODEXTRIN

Cyclodextrins, also known as Schardinger dextrins, are comprised of six or more anhydro-alpha-D-glucose residues bonded together with 1,4-linkages to form cyclic compounds. Cyclodextrins may be more specifically classified by the number of glucose units present. A six-membered ring or torus is referred to as alpha-cyclodextrin or cyclohexaamylose, a seven-membered ring as beta-cyclodextrin or cycloheptaamylose and so forth.

As a result of their unique cyclic structure, cyclodextrins offer considerable potential as complexing agents because they form inclusion compounds with molecules which reside within the cavity of the cyclic molecule. Potential applications in the food, tobacco, and medicinal fields, as well as many other fields, are numerous.

Cyclodextrins are produced from starch by the action of an enzyme commonly known as cyclodextrin transglycosylase (*B macerans* amylase). The source of the enzyme is usually a culture of *Bacillus macerans*. To produce the cyclodextrin synthesizing enzyme, *Bacillus macerans* is grown under suitable conditions on appropriate media containing suitable sources of nitrogen, carbon, growth factors and minerals. Various appropriate methods for producing cyclodextrin transglycosylase are described in the literature (see, for example, D. French in Methods in Enzymology, S. P. Colowick and N. O. Kaplan, editors, Academic Press, New York, New York, Vol. 5, pp. 148–155, 1962).

According to conventional past procedures for producing cyclodextrins, cyclodextrin transglycosylase is added to a dilute solution of an appropriate gelatinized starch and enzymolysis is permitted to proceed under conditions which are conducive to continued enzyme action for sufficient time to permit the conversion of the starch to cyclodextrins.

While there have been a number of improvements of the basic method of making cyclodextrins as briefly outlined above, and practical means for the production and purification of beta-cyclodextrin do exist, to date there is no practical means for the production of pure alpha-cyclodextrin. The alpha-cyclodextrin is generally produced in a mixture containing both alpha-cyclodextrin and the beta-cyclodextrin. Yet, in many instances, one desires to obtain only the alpha- or the beta-cyclodextrin form. It is particularly desirable to obtain a substantially purified form of alpha-cyclodextrin since it has high water solubility relative to the beta form, and thus, can be utilized in many applications where corresponding use of the beta form would be impractical. Again, the alpha and beta forms in some instances selectively complex different materials. That is, one of the forms may complex a specific material while the other does not have this capability. Thus, it would be advantageous to obtain a pure source of the alpha form in order to take advantage of its selective complexing ability.

To date, there are a number of known techniques to obtain a relatively pure source of the beta form. One such technique is to dissolve the mixture of the alpha- and beta-cyclodextrin in hot water. The beta form, being materially less soluble than the alpha form, crystallizes upon cooling the aqueous dissolved mixture down to room temperature. This leaves the more soluble alpha form in solution along with some residual beta-cyclodextrin. However, the highest enrichment of alpha-cyclodextrin that one can obtain by this procedure is about 89 percent alpha-cyclodextrin, 11 percent beta-cyclodextrin.

Even if a method of separating relatively pure alpha-cyclodextrin from mixtures of the alpha and beta forms is subsequently discovered it would still be more advantageous to produce alpha-cyclodextrin directly and in high yield from the parent starch without resort to a separation step. Using such a method, the parent starch would be converted exclusively or practically exclusively to alpha-cyclodextrin. Thus, higher overall total yields of alpha-cyclodextrin per gram of starch converted could be obtained.

In view of the above, it therefore becomes an object of the invention to provide a simple, inexpensive and practical method of producing relatively pure alpha-cyclodextrin from a starch substrate.

Another object of the invention is to provide a method of preparing alpha-cyclodextrin directly from a starch substrate in a higher yield per volume of conversion liquor than was previously possible.

A still further object of the invention is to provide a method for directly preparing pure alpha-cyclodextrin which does not require the step of separating the alpha-cyclodextrin from other cyclodextrins.

Yet another object of the invention is to provide an improved method for making alpha-cyclodextrin complexes where the improvement consists of utilizing a specific class of alpha-cyclodextrin complexants.

A more specific object of the invention is to provide a method of producing alpha-cyclodextrin from starch having a purity of at least 95 percent and preferably close to a 100 percent purity.

Another specific object of the invention is to provide a method of making high purity alpha-cyclodextrin in high yields from unmodified starch, granular modified starch, thinned starch and mixtures thereof.

Other objects will appear hereinafter.

In general, a process has been discovered for the production of alpha-cyclodextrin. Broadly speaking the method of the invention comprises providing a water solution of a gelatinized starch, subjecting said solution to the action of a cyclodextrin transglycosylase enzyme in the presence of a chemical selected from chemicals which will form a complex with alpha-cyclodextrin and mixtures thereof, and recovering a product containing alpha-cyclodextrin.

To obtain maximum alpha-cyclodextrin yields, it is essential that the alpha-cyclodextrin complexant contain a saturated or unsaturated aliphatic radical with a longest straight chain carbon skeleton at least eight carbon units in length, bonded at one end to an electronegative (for a definition of electronegativity see, for example, Van Nostrand's International Encyclopedia of Chemical Science, D. Van Nostrand Co., Inc., Princeton, New Jersey, 1964) atom, such as the oxygen atom in alcohols, aldehydes, etc., the sulfur atom in thiols, carbothioic acids, etc., the nitrogen atom in nitriles, etc. or the halogen atom in organic fluorides, chlorides, and bromides. It is essential that the electronegative group contain an atom which is at least as electronegative as sulfur attached to one end of a straight chain carbon skeleton at least eight carbon atoms in length. Preferably the electronegative group is attached to one end of a straight chain carbon skeleton eight to 18 carbon atoms in length. It is also preferable that the complexant be a liquid at the conversion temperature employed.

Alpha-cyclodextrin complexants particularly usable in the practice of this invention include complexants of the formulas

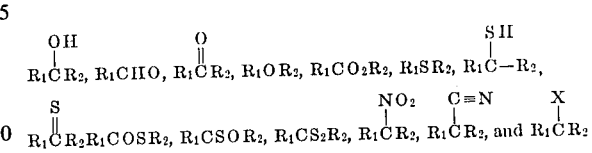

where $R_1$ represents a straight chain saturated or unsaturated aliphatic radical with a longest straight chain carbon skeleton at least eight carbon atoms in length, $R_2$ represents hydrogen or a straight chain saturated or unsaturated aliphatic radical with a longest straight chain carbon skeleton one to 12 carbon atoms in length and X represents a fluorine, chlorine or bromine atom.

Examples of such complexants are 1-octanol, 1-nonanol, 1-decanol, 1-undecanol, 2-undecanol, 1-dodecanol, 9-decen-1-ol, 1-octadecanol, 1-decanal, 1-dodecanal, 2-decanone, didecyl ether, 1-decanoic acid, methyl octanoate, methyl decanoate, methyl dodecanoate, 1-decanethiol, 1-undecanenitrile and 1-decyl chloride. The most preferred complexant is 1-decanol due to its ready availability and the fact that essentially pure alpha-cyclodextrin can be produced when this complexant is utilized.

It is essential that the complexant used not interact with the starch to convert the starch solution being incubated into an insoluble starch paste upon which the cyclodextrin transglycosylase cannot efficiently act. Amines for example, interact in this manner.

The starch used in practicing the invention may be derived from any vegetable source, such as, for example, corn, wheat, potato, tapioca, rice, sago, and grain sorghum. Waxy starch may also be used. Crude starch sources such as ground cereals, macerated tubers, or the partially purified starches therefrom are additionally usable. The term "starch" is used broadly herein and encompasses unmodified starch and tailings and, as well, starch that has been modified by treatment with acids, alkalies, enzymes, heat, etc. Soluble or partially soluble modified starches, dextrins, pregelatinized products and starch derivatives of different types are also suitable in the process.

Solubilization is carried out by heating a starch slurry to above the gelatinization temperature of about 65° C. Incubation is performed at a temperature of at least 30° C., usually at a temperature falling within the range from about 40° C. to about 65° C., and preferably, at a temperature falling within the range from about 50° C. to about 55° C.

In a preferred embodiment of the invention, the pH of the starch solution is adjusted to fall in the range from about 5 to about 8 during the incubation with cyclodextrin transglycosylase. Most preferably, the pH is adjusted to fall in the range of from about 6.5 to about 7.5. Such pH adjustment may be brought about through the addition of any base or acid. Preferably, the pH adjustment is brought about through addition of sodium carbonate or hydrochloric acid.

It is preferred that the amount of cyclodextrin transglycosylase enzyme utilized be measured so that the reaction will be completed within about 1 to about 7 days. Most preferably, the amount of cyclodextrin transglycosylase added will be measured so that the reaction will be completed within 4 to 7 days. Preferably, the amount of cyclodextrin transglycosylase added will fall in the range of from about 100 to about 1,000 Tilden-Hudson units per 100 grams of starch. The cyclodextrin transglycosylase activity in cultures of *Bacillus macerans* can be measured by the Tilden-Hudson procedure as described by those two workers in J. Bacteriol, 43, 527–544, 1942.

In order to obtain maximum yields of alpha-cyclodextrin, it is essential that the conversion be conducted in the presence of a suitable alpha-cyclodextrin complexant that complexes with the alpha-cyclodextrin as it is synthesized and thereby induces the desired enzymatic reaction to proceed. Addition of the alpha-cyclodextrin complexant after the incubation is completed will not lead to high yields of alpha-cyclodextrin. In general, it is preferable that the complexant be added after the incubation has been continued for 1 to 6 hours. At the end of this period of time the starch substrate is degraded sufficiently so that it will not excessively adsorb the complexant but is not degraded sufficiently to lower the alpha-cyclodextrin yield. The amount of alpha-cyclodextrin complexant required is that amount which will complex with substantially all of the alpha-cyclodextrin synthesized, although the alpha-cyclodextrin complexant may be supplied in excess, of course. Reducing the complexant to a concentration significantly below the amount that will complex with substantially all the alpha-cyclodextrin results in decreased yields of alpha-cyclodextrin.

For maximum efficiency, it is preferred that the alpha-cyclodextrin conversions be conducted at high solids concentrations, such as 20 to 35 percent solids. Thinned and modified starches can readily be solubilized to form solutions with these solids contents. This reduces the equipment and processing costs per quantity of alpha-cyclodextrin produced. The use of the above defined complexants is particularly well suited for alpha-cyclodextrin conversions conducted at high solids concentrations.

A novel feature of this invention is that none of the above defined complexants were previously used in cyclodextrin conversions and therefore the fact that they lead to the accumulation of alpha-cyclodextrin was previously unknown. A further novel feature of this invention is that utilizing these particular cyclodextrin complexants starch can be converted in high solids conversions to a cyclodextrin product containing at least about 47 percent by weight alpha-cyclodextrin based on the cyclodextrin produced. Tetrachloroethane, the best of the prior art complexants for producing alpha-cyclodextrin, will produce only about 38 percent alpha-cyclodextrin under these conditions.

The following analytical method was used to determine the respective amounts of alpha- and beta-cyclodextrin present in the cyclodextrin mixtures.

Essentially, the method involved conversion of the cyclodextrins to their dimethylsilyl ether complexes in pyridine solution. The converted products were then separated according to molecular size on a gas chromatographic column and their concentrations measured by a flame ionization detector upon elution from the column.

More specifically, an appropriate amount of a standard cyclodextrin mixture, that is, one approximately similar to the one being measured is weighed into a 25 milliliter volumetric flask. 4.0 ml. of pyridine, 4.0 ml. of tetramethyl disilazine, and 0.4 ml. of trifluoroacetic acid are then added to the flask. After the reaction is subsided, the flask is mixed and boiled for 15 minutes on a hotplate. The flask is then cooled and diluted to volume with pyridine. A 3-microliter portion of the solution is removed and injected into the chromatograph whereby the various components are eluted. When the last component has been eluted the area under the various peaks is determined using a suitable method of integration.

The sample to be analyzed is weighed accurately in an amount of about 100–110 mg. of total cyclodextrin sample. This amount is placed into a 25 ml. volumetric flask, 5 ml. of distilled water is added, and the cyclodextrin and water is then mixed. The water is allowed to evaporate completely on a steam bath and the above described reagents are added. The just described chromatographic procedure is then followed and the concentration of each component of alpha- or beta-cyclodextrin is obtained by comparing standard and sample areas for the particular component according to the following equation. Percent component composition is then measured in the following manner.

$$\text{Percent component composition} = 100 \times \left[\frac{(\text{Sample component area} \times \text{attenuation}) \times (\text{Standard component weight})}{(\text{Standard component area} \times \text{attenuation}) \times (\text{Sample weight})}\right]$$

The following examples illustrate typical modes of carrying out the aims of the invention. It is understood, of course, that these examples are merely illustrative and the invention is not to be limited thereto. All parts and percentages are in terms of weight unless otherwise indicated.

EXAMPLE I

This example illustrates the results obtained in cyclodextrin conversions performed under preferred conditions at high solids concentrations utilizing cyclodextrin complexants selected from the prior art. This example also illustrates the conversion results obtained when hydrocarbons, which lack the electronegative substituent group required for alpha-cyclodextrin accumulation, are used as complexants.

To a 30 percent by weight suspension of potato starch at pH 7.2 was added the bacterial alpha amylase preparation HT-1000 (the proprietary name of a bacterial alpha amylase of the *Bacillus subtilis* type produced and marketed by Miles Chemical Laboratories) at a concentration of 0.025 percent on a starch solid basis. The suspension was gradually added during a 30-minute period to a continuously agitated vessel maintained at 90° to 92° C. After completion of addition, the starch was maintained at a temperature falling within the range from about 90° C. to about 92° C. for an additional 15 minutes until the starch was partially hydrolyzed to a D. E. falling in the range from about 2 to about 2.5. The hydrolyzed starch was then immediately heated to 121° C. and held 15 minutes to destroy residual alpha amylase activity.

The starch hydrolyzate thus obtained was then cooled to 50° C. and the pH was adjusted to fall in the range from about 7.0 to about 7.2. Cyclodextrin transglycosylase was then added to the hydrolyzate at an enzyme dosage of 450 Tilden-Hudson units per 100 grams of starch hydrolyzate solids. About 4 hours later the cyclodextrin complexant to be used was added to the solution at a concentration of about 10 grams per 100 milliliters. Enzymolysis was continued at 50° C. and at a pH falling in the range from about 7.0 to about 7.2 for a time falling in the range from about 3 to about 7 days with agitation being provided. The conversions were terminated by heating to 100° C. for 15 minutes to inactivate the cyclodextrin transglycosylase.

As the cyclodextrins were produced during the course of the conversion, they usually precipitated quantitatively as the insoluble cyclodextrin-complexant complexes. However, to ensure the complete recovery of the cyclodextrins produced, they were recovered by the trichloroethylene precipitation technique outlined below.

When the conversion liquors had cooled to about 30° C., 10 ml. of trichloroethylene was added per 100 ml. of conversion liquor and the resulting mixtures were agitated at 30° C. for 24 hours. A mixture was then vacuum filtered and the filter washed with a quantity of water cooled to 5° C. equivalent to 10 percent of the volume of the conversion liquor. The filter cake was quantitatively recovered and dried at 80° C. under a vacuum of about 28 inches of mercury for 48 hours.

The yield of crude cyclodextrins was calculated from the weight of the cyclodextrin filter cake by the following formula.

Percent cyclodextrin yield = 100
$\times \dfrac{\text{(Dried weight of filter cake per volume of liquor)}}{\text{(Weight of starch solids per volume of liquor)}}$ The cyclodextrin content of the filter cake was determined by the chromatographic procedure previously described.

Table I illustrates the conversion results obtained in 30 percent solids conversions of partially hydrolyzed potato starch in which the cyclodextrin complexants included in the conversion mixture were selected from those known in the prior art.

TABLE I.—EFFECT OF TYPICAL COMPLEXANTS UPON CYCLODEXTRIN PRODUCTION

| Complexant | Age of conversion (days) | Crude cyclodextrin yield (Percent of substrate) | (g./100 ml.) | Percent of cyclodextrin in crude product that is: Alpha | Beta |
|---|---|---|---|---|---|
| Toluene | 3 | 39 | 12.9 | 0 | 100 |
| Benzene | 3 | 52 | 17.2 | 0 | 100 |
| p-Cymene | 4 | 51 | 16.8 | 0 | 100 |
| Bromobenzene | 3 | 28 | 9.2 | 1 | 99 |
| Trichloroethylene | 3 | 42 | 13.9 | 0 | 100 |
| Tetrachloroethane | 3 | 56 | 18.5 | 38 | 62 |
| Hexane | 3 | 42 | 13.9 | 0 | 100 |
| Octane | 3 | 32 | 10.6 | 0 | 100 |
| Decane | 7 | 27 | 8.9 | 4 | 96 |
| Cyclohexane | 3 | 58 | 19.1 | 0 | 100 |
| Cyclooctane | 6 | 73 | 24.1 | 0 | 100 |
| Cyclododecane | 6 | 41 | 13.5 | 0 | 100 |
| Decene | 7 | 47 | 15.5 | 0 | 100 |
| Dodecene | 7 | 42 | 13.9 | 17 | 83 |
| 1,9-decadiene | 7 | 64 | 21.1 | 0 | 100 |

These results show that only tetrachloroethane and dodecane induce a significant amount of alpha-cyclodextrin production and, even in the case of these complexants alpha-cyclodextrin is produced in substantially lesser quantities than is beta-cyclodextrin.

EXAMPLE II

Certain of the higher alcohols are particularly well suited for promoting the production of alpha-cyclodextrin in high solids conversions. Many of the higher alcohols are readily available, relatively inexpensive, give very high yields of alpha-cyclodextrin and possess relatively low boiling points which permit their removal from cyclodextrin complexes by conventional distillation techniques.

Table II illustrates the effect of alcohol carbon-chain length on alpha-cyclodextrin accumulation in conversions at 30 percent solids conducted in the manner described in Example I.

TABLE II.—EFFECT OF ALCOHOLS UPON CYCLODEXTRIN PRODUCTION

| Complexant | Age of conversion (days) | Crude cyclodextrin yield (Percent of substrate) | (g./100 ml.) | Percent of cyclodextrin in crude product that is: Alpha | Beta |
|---|---|---|---|---|---|
| 1-Butanol | 3 | 24 | 7.9 | 0 | 100 |
| 1-Pentanol | 3 | 39 | 12.9 | 44 | 56 |
| 3-Heptanol | 3 | 46 | 15.2 | 34 | 66 |
| 1-Hexanol | 3 | 37 | 12.2 | 35 | 65 |
| 1-Heptanol | 2 | 46 | 15.2 | 41 | 59 |
| 1-Octanol | 3 | 58 | 19.1 | 53 | 47 |
| 3-Decanol | 7 | 55 | 18.2 | 40 | 60 |
| 1-Nonanol | 6 | 66 | 21.8 | 79 | 21 |
| 1-Decanol | 6 | 67 | 22.1 | 97 | 3 |
| 2-Undecanol | 7 | 62 | 20.5 | 68 | 32 |
| 9-Decen-1-ol | 7 | 58 | 19.1 | 75 | 25 |
| 1-Undecanol | 7 | 63 | 20.8 | 88 | 12 |
| 1-Dodecanol | 6 | 64 | 21.1 | 86 | 14 |
| 2-Tetradecanol | 7 | 72 | 24.1 | 55 | 45 |
| 1-Tetradecanol | 7 | 87 | 28.7 | 70 | 30 |
| 1-Hexadecanol | 7 | 85 | 28.0 | 72 | 28 |
| 1-Octadecanol | 7 | 79 | 26.0 | 82 | 18 |

The results show that the alcohols which contain a saturated or unsaturated aliphatic radical with a longest straight chain carbon skeleton at least eight carbon units in length induce predominantly the formation of alpha-cyclodextrin in high solids conversions. This is in contrast to the use of lower alcohols and the complexants of the prior art as shown in Example I.

The use of 1-decanol is particularly advantageous for the purposes of inducing alpha-cyclodextrin in very high yields and the cyclodextrin produced is nearly all in the alpha form. Thus, to obtain pure alpha-cyclodextrin, it is only necessary to harvest the crude cyclodextrin product, resuspend it in pure water, heat to break the cyclodextrin-decanol complex, distill off the decanol, and cool to crystallize pure alpha-cyclodextrin. No additional tedious separation steps are required to separate the alpha- and beta-cyclodextrins.

EXAMPLE III

This example illustrates the production of a large quantity of pure alpha-cyclodextrin by a preferred embodiment of this invention.

A 14-kilogram quantity of potato starch (13 percent moisture) was suspended in water to a total volume of 36 liters. The pH was adjusted to 7.2 and HT-1000 bacterial alpha amylase was added at a concentration of 0.03 percent based on the starch solids present. This slurry was added over a 35-minute period to a stirred 50-liter vessel maintained at a temperature falling within the range of from about 90° C. to about 92° C. After completion of starch addition, the liquefied starch was stirred an additional 40 minutes at a temperature falling within the range of from about 90° C. to about 92° C. during which time the starch was partially hydrolyzed to a D.E. of 1.7. The partially hydrolyzed starch was then heated to 122° C. for 15 minutes to inactivate residual bacterial alpha amylase.

The partially hydrolyzed starch was then cooled to 55° C. The pH was adjusted to 7.0 and cyclodextrin transglycosylase was added at a level of 520 Tilden-Hudson units per 100 grams of starch solids.

Five hours after addition of the cyclodextrin transglycosylase 3.6 liters of 1-decanol was added to the conversion mixture. Enzymolysis was continued for 7 days at a temperature falling within the range from about 52° C. to about 55° C. and at a pH of about 7.0.

Residual cyclodextrin transglycosylase activity was destroyed by adjusting the conversion mixture to pH 3.5 with hydrochloric acid. After 45 minutes at pH 3.5, the pH was readjusted to 7.0 with sodium hydroxide, and 0.02 percent HT-1000 bacterial alpha amylase, based on original starch solids present, was added to the conversion mixture to digest any residual unreacted starch. The digestion was continued for 19 hours at 52° C.

The insoluble cyclodextrin-decanol complex was recovered by filtration and resuspended in water. The complex was broken and the decanol driven off by steam distilling at 138° C., after which the cyclodextrin solution was cooled to 80° C., diluted to about 15 percent solids and refined with activated carbon. The mixture was then filtered to remove the carbon, concentrated to about 46 percent solids, cooled to 5° C., and stirred to promote crystallization. After 18 hours at 5° C. the first crop of cyclodextrin crystals was recovered by filtration and the filter cake was washed with about 1,000 ml. of chilled water. The filter cake was recovered, dried for 40 hours at 60° C., weighed and analyzed.

The wash water and mother liquor from the first crystallization were combined and concentrated by evaporation to about 52 percent solids. A second crystallization step was then carried out at 5° C. for 20 hours and a second crop of crystals was recovered in the manner described above.

The results of this conversion are summarized below:

TABLE III

PRODUCTION OF ALPHA CYCLODEXTRIN

| Material | Weight (grams dry substance) | Cyclodextrin Content alpha | beta | % of substrate |
|---|---|---|---|---|
| Starch Substrate | 12,270 | — | — | 100 |
| Cyclodextrin Crystals first crop | 4,850 | 100 | nil | 40 |
| Cyclodextrin Crystals second crop | 650 | 100 | nil | 5 |

The wash water and mother liquor from the second crystallization step were not concentrated further; however, as is obvious, subsequent concentration and crystallization steps could have been performed. Or, if preferred, the cyclodextrins present in mother liquor from the first or second crystallization steps could have been recovered by conventional recycle techniques.

EXAMPLE IV

This example illustrates that other long chain organic compounds such as, appropriate aldehydes, ketones, ethers, acids, esters, thiols, nitriles, and halides may also be used as complexants to induce the accumulation of alpha-cyclodextrin in high solids concentrations provided that their molecular structure contains a saturated or unsaturated carbon radical with a longest straight chain carbon skeleton at least eight carbon atoms in length, bonded to an electronegative atom at least as electronegative as sulfur.

The conversions which were conducted in the presence of complexants suitable for the practice of this invention, were performed on thinned potato starch at 30 percent solids concentration following the procedures described in Example I. The results are presented in Table IV.

Table IV

| Complexant | Age of conversion (days) | Crude cyclodextrin yield (Percent of substrate) | (g./ 100 ml.) | Percent of cyclodextrin in crude product that is: Alpha | Beta |
|---|---|---|---|---|---|
| 1-Decanal | 7 | 57 | 18.8 | 85 | 15 |
| 1-Dodecanal | 7 | 69 | 22.8 | 76 | 24 |
| 2-Decanone | 7 | 53 | 17.5 | 47 | 53 |
| Didecyl ether | 7 | 58 | 19.1 | 79 | 21 |
| 1-Decanoic acid | 7 | 23 | 7.6 | 88 | 12 |
| Methyl octanoate | 7 | 60 | 19.8 | 60 | 40 |
| Methyl decanoate | 7 | 60 | 19.8 | 66 | 34 |
| Methyl dodecanoate | 7 | 58 | 19.1 | 51 | 49 |
| 1-Decyl chloride | 7 | 55 | 18.2 | 86 | 14 |
| 1-Decanethiol | 7 | 59 | 19.5 | 61 | 39 |
| 1-Undecanenitrile | 7 | 64 | 21.1 | 61 | 39 |

EXAMPLE V

This example illustrates that granular unmodified starch may also be used for the production of alpha-cyclodextrin by the process of this invention and that the solids concentration at which the conversions are conducted is not critical.

Unmodified potato starch was suspended in water at a concentration of 5.2 grams dry substance per 100 ml. This slurry was heated to a temperature falling within the range of from about 90° C. to about 95° C. in order to completely gelatinize the starch. The gelatinized starch solution was cooled to a temperature falling within the range of from about 50° C. to about 55° C. The pH was adjusted to fall within the range of from about 7.0 to about 7.5 and the solution was dosed with cyclodextrin transglycosylase at a level of about 450 Tilden-Hudson units per 100 grams of starch solids. 1-decanol and complexants selected from among those known in the prior art were added to the conversion mixtures 1 to 2 hours after enzyme addition at a concentration of 5 ml. per 100 ml. of starch solution.

The conversions were continued with agitation for up to 7 days at about 50° C. and at a pH falling within the range of from about 7.0 to about 7.5. The cyclodextrins produced were harvested as insoluble cyclodextrin-complexant precipitates by direct filtration of the conversion liquor at the termination of the conversion. The crude products were dried and analyzed as described in Example I. The conversion results are presented in Table V.

TABLE V.—CYCLODEXTRIN PRODUCTION FROM 5% SOLUTION OF POTATO STARCH

| Complexant | Age of conversion (days) | Crude cyclodextrin yield (Percent of substrate) | (g./ 100 ml.) | Percent of cyclodextrin in crude product that is: Alpha | Beta |
|---|---|---|---|---|---|
| 1-Decanol | 4 | 37 | 1.9 | 100 | nil |
|  | 7 | 40 | 2.1 | 100 | do. |
| Cyclohexane | 4 | 50 | 2.6 | 30 | 70 |
|  | 7 | 50 | 2.6 | 25 | 75 |
| Toluene | 4 | 21 | 1.1 | Nil | 100 |
|  | 7 | 33 | 1.7 | do. | 100 |

EXAMPLE VI

This example illustrates the applicability of the process of this invention to the conversion of acid modified starch into alpha-cyclodextrin.

In this example, waxy milo starch which had been acid modified by conventional procedures to 80 fluidity was suspended in water at a concentration of 21.5 grams dry substance per 100 ml. This slurry was heated to a temperature falling within the range of from about 85° C. to about 90° C. to completely gelatinize the starch. The gelatinized starch solution was cooled to a temperature falling within the range of from about 50° C. to about 55° C. The pH of the solution was adjusted to about 6.2 and the solution was dosed with cyclodextrin transglycosylase at a level of about 450 Tilden-Hudson units per 100 grams of starch solids. The complexants to be compared were added to the conversion mixtures 1 to 2 hours after enzyme addition at a concentration of 10 ml. per 100 ml. of starch substrate.

The conversions were continued with agitation for 7 days at about 50° C. and at about pH 6.2. The cyclodextrins produced were harvested as described in Example V, dried and analyzed. The conversion results were as shown in Table VI.

TABLE VI.—PRODUCTION OF CYCLODEXTRINS FROM ACID MODIFIED WAXY MILO STARCH

| Complexant | Crude cyclodextrin yield | | Percent of cylcodextrin in crude product that is: | |
|---|---|---|---|---|
| | Percent of substrate | (g./100 ml.) | Alpha | Beta |
| 1-Decanol | 50 | 10.7 | 100 | Nil |
| Cyclohexane | 50 | 10.7 | Nil | 100 |
| Toluene | 54 | 11.7 | ...do... | 100 |
| Trichloroethylene | 51 | 11.0 | ...do... | 10 |

The essential features of the complexants suitable for the practice of this invention is that they contain a saturated or unsaturated aliphatic radical with a longest straight chain carbon skeleton at least eight carbon units in length bonded at one end of said longest straight chain to an electronegative atom at least as electronegative as sulfur.

An advantage to the use of the above-mentioned complexants is that they are conducive to the production of high yields of alpha-cyclodextrin per volume of conversion substrate in high solids conversions. Another advantage is that with certain of these complexants such as 1-decanol, for example, it is possible to produce alpha-cyclodextrin in unprecedented high yields with the almost complete exclusion of beta-cyclodextrin. This leads to the advantage that no additional cyclodextrin separation procedures are necessary to prepare alpha-cyclodextrin in purified form.

A novel feature of this invention is the high alpha-cyclodextrin yield of over about 47 percent by weight of the cyclodextrin produced obtainable utilizing these complexants.

The high alpha-cyclodextrin yields obtainable with these complexants are quite surprising. Alpha-cyclodextrin has a smaller internal cavity (about 6 angstrom diameter) than beta-cyclodextrin (about 8 angstrom diameter). Therefore, one would expect smaller molecules such as 1-butanol or 1-hexanol for example, to fit better into the alpha-cyclodextrin cavity and contribute to higher alpha-cyclodextrin yields rather than larger molecules such as 1-decanol or 1-dodecanol for example. Such is not the case. In fact, to obtain predominantly alpha-cyclodextrin it is essential that the complexant used contain a saturated or unsaturated aliphatic radical with a longest straight chain at least eight carbon atoms long. Complexants with longest straight chains about 10 carbon atoms long lead to maximum yields of alpha-cyclodextrin. Although the use of long chain hydrocarbons with electronegative substituent groups leads to alpha-cyclodextrin production, the use of long chain hydrocarbons that lack this substituent group cannot lead to alpha-cyclodextrin production. For example, the cyclodextrins produced in high solids conversions which include 1-decanol are essentially 100 percent alpha-cyclodextrin whereas conversions which contain n-decane yield nearly 100 percent beta-cyclodextrin. This result is completely unexpected since both n-decane and 1-decanol have nearly identical molecular sizes and shapes.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

The invention is hereby claimed as follows:

What is claimed is:

1. A process for producing alpha-cyclodextrin comprising: subjecting a gelatinized starch to the action of a cyclodextrin transglycosylase enzyme in the presence of an alpha-cyclodextrin complexant which contains a saturated or unsaturated aliphatic radical with a longest straight chain at least eight carbon atoms in length bonded at one end of said longest straight chain to an atom at least as electronegative as sulfur.

2. The process in accordance with claim 1 wherein said alpha-cyclodextrin complexant is selected from the group consisting of

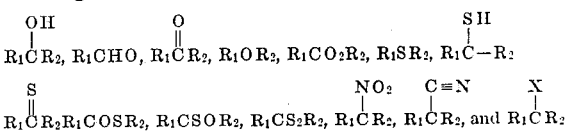

where $R_1$ represents a saturated or unsaturated aliphatic radical containing a longest straight chain having at least eight carbon atoms, $R_2$ represents hydrogen or a saturated or unsaturated aliphatic radical containing a longest straight chain having one to 12 carbon atoms, and X represents fluorine, chlorine or bromine.

3. The process in accordance with claim 2 wherein said alpha-cyclodextrin complexant is 1-decanol.

4. The process in accordance with claim 2 wherein said gelatinized starch is subjected to the enzymatic action at a temperature falling within the range of from about 40° C. to about 65° C. and at a pH falling within the range of from about 5 to about 8.

5. The process in accordance with claim 4 wherein said starch is selected from the group consisting of unmodified starch, thinned starch, modified starch and mixtures thereof.

6. The process in accordance with claim 6 wherein said starch is an enzyme thinned starch.

7. A process for producing alpha-cyclodextrin comprising:
   a. providing a gelatinized starch solution;
   b. adding a cyclodextrin transglycosylase enzyme to said solution;
   c. adding to said solution an alpha-cyclodextrin complexant which contains a saturated or unsaturated aliphatic radical with a longest straight chain at least eight carbon atoms in length bonded at one end of said longest straight chain to an atom at least as electronegative as sulfur;
   d. incubating said solution; and
   recovering a product containing alpha-cyclodextrin.

8. The process in accordance with claim 7 wherein said alpha-cyclodextrin complexant contains a saturated or unsaturated aliphatic radical with a longest straight chain at least eight carbon atoms in length bonded at one end of said longest straight chain to an atom at least as electronegative as sulfur.

9. The process in accordance with claim 7 wherein said alpha-cyclodextrin complexant is selected from the group consisting of

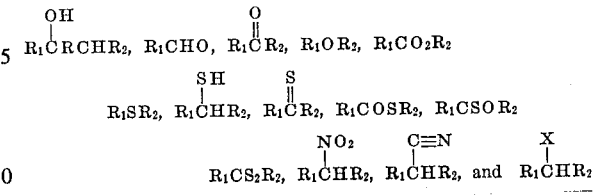

where $R_1$ represents a saturated or unsaturated aliphatic radical containing a longest straight chain having at least eight carbon atoms, $R_2$ represents hydrogen or a saturated or unsaturated aliphatic radical containing a longest straight chain having one to 12 carbon atoms, and X represents fluorine, chlorine or bromine.

10. The process in accordance with claim 9 wherein said gelatinized starch is subjected to the enzymatic action at a temperature falling within the range of from about 40° C. to about 65° C. and at a pH falling within the range of from about 5 to about 8.

11. The process in accordance with claim 10 wherein said starch is selected from the group consisting of unmodified starch, modified starch, thinned starch and mixtures thereof.

* * * * *